March 29, 1932.  R. W. MORSE  1,851,368
SUPPORTING MEANS FOR AIRCRAFT SUSTAINING ROTORS
Filed April 10, 1931
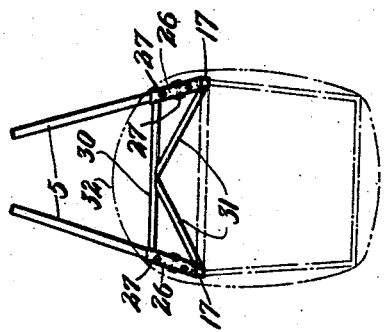
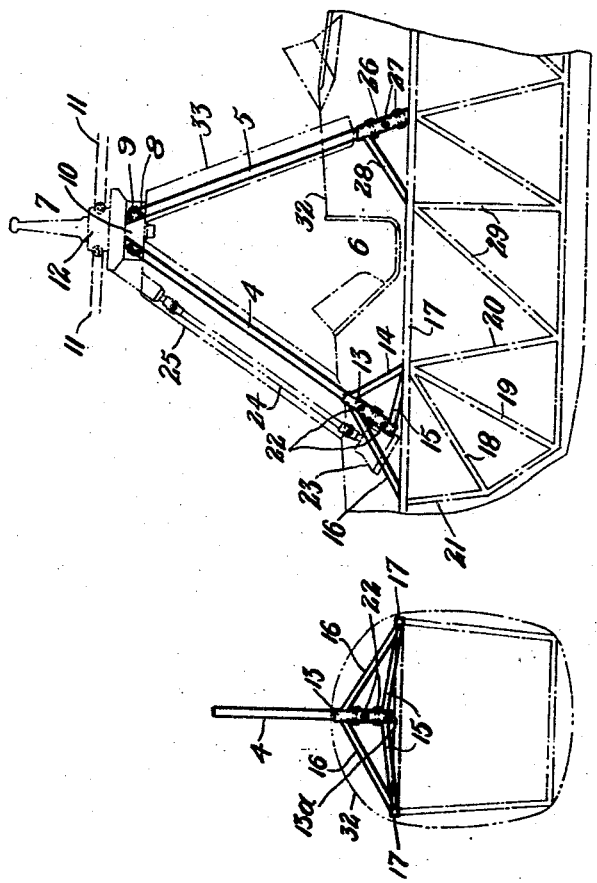
INVENTOR
Roy W. Morse
BY
Lyunestvedt + Lechner
ATTORNEYS Patented Mar. 29, 1932

1,851,368

UNITED STATES PATENT OFFICE

ROY W. MORSE, OF WILLOW GROVE, PENNSYLVANIA, ASSIGNOR TO AUTOGIRO COMPANY OF AMERICA, OF PHILADELPHIA, PENNSYLVANIA, A CORPORATION OF DELAWARE

SUPPORTING MEANS FOR AIRCRAFT SUSTAINING ROTORS

Application filed April 10, 1931. Serial No. 529,075.

This invention relates to supporting means for aircraft sustaining rotors and is particularly concerned with means of support for rotors of the type embodying a plurality of sustaining blades mounted for rotation about a common substantially vertically disposed axis.

Aircraft of this general type preferably include individual pivots or articulations for the blades in order that they may be free independently to assume various positions under the influence of inertia, lift and other forces to which they are subjected in flight operation.

Since the major sustension of aircraft of this general character is ordinarily afforded by the rotor or sustaining blades and since, in order to prevent fouling on other portions of the craft, such, for example, as the empennage or propeller, it is desirable to mount the rotor system at a substantial distance above the body of the aircraft, the mounting structure should be such as to adequately transmit the lift thrust to the body. In addition, mounting structures of this type should have very great strength as against lateral and torsional strains or forces.

For example, where a mechanical rotor starter is employed, the reaction incident to the application of starting power is conveniently imposed upon the rotor mounting structure. This, as will readily be understood, subjects various elements of the mounting structure to bending and twisting strains, the character of which will be considered more in detail hereinafter.

The present invention is primarily concerned with mounting structures of the character referred to, the invention making provision for strength of parts which is adequate to transmit the lift thrust as well as to resist bending and twisting forces to which the mounting is subjected.

The general nature of the invention and objects and advantages in addition to those noted above, will be more apparent from a consideration of the following description taken with the accompanying drawings, in which—

Fig. 1 is a side view of the structure of the present invention, the view including portions of an aircraft fuselage, sustaining rotor and rotor starter somewhat diagrammatically indicated in dot and dash lines.

Fig. 2 is a view, from the front, of various parts illustrated in Fig. 1, and

Fig. 3 is a view similar to Fig. 2 but taken from the rear of Fig. 1.

In the present embodiment the rotor mounting structure takes the general form of a pyramid or pylon composed of three post or leg members 4 and 5—5, although it will be understood that a different number of legs may be employed. These leg members in accordance with the present showing are squared or angular in cross section. The leg 4 is disposed generally forwardly of a cockpit 6 in the fuselage, the same being extended upwardly substantially centrally of the craft as appears most clearly in Fig. 2. The two legs 5 are disposed generally rearwardly of the cockpit 6 and extend upwardly from the sides of the craft toward the rotor axis mechanism 7. All three pylon legs converge toward their upper ends to a point lying substantially above the cockpit 6, at which point the legs are secured, as by means of bolts or rivets 8 and 9, to an inter-bracing apex device 10 which need not be considered in detail herein, although, it should be understood, of course, that suitable pockets or ears are embodied in the apex box in order to engage the leg members and provide a means of reaction for the securing bolts 8 and 9.

Attention is also called to the fact that this general type of "tripod pylon" is not a part of the present invention per se, but is described and claimed in the copending application of Juan de la Cierva, Serial No. 497,745, filed November 24, 1930.

The rotor construction itself need not be considered in detail herein. It might be noted, however, that in Fig. 1 portions of a pair of rotor blades are somewhat diagrammatically indicated at 11, these blades being pivoted or articulated to the hub member 12.

The pylon legs are associated with bracing elements or parts at their lower ends in such manner as to provide for fixation of the legs, over a section thereof, as against transverse as well as torsional flexure. The bracing means or frame for the forward leg 4 includes a socket member 13 which is arranged to receive the lower end of the leg and which is rigidly positioned by means of diagonal or triangulated bracing elements 14, 15 and 16. The socket 13 is rigidly supported as against longitudinal and torsional flexure or bending by virtue of the attachment thereto of the bracing elements at spaced points. The socket 13, furthermore, may be rounded to receive a leg of circular cross section or, as shown in Fig. 2, this socket may be squared or angled to receive a leg having a similarly angled end portion (see 13a).

As is seen in Figs. 1 and 2 the attachment of the bracing elements, which may be accomplished by welding, is toward the ends of the socket 13 from which points the bracing elements extend angularly to fuselage longérons or cross braces. As seen in Fig. 1 the braces 14, 15 and 16 are secured to the upper fuselage longérons 17 at the joining or meeting points of one or more longéron braces 18, 19, 20 and 21. Attachment of the pylon in this manner provides for distribution of stresses throughout the entire fuselage frame as will readily be understood.

The fuselage longérons 17 (see Fig. 2) to which the bracing elements are secured, may be formed of round tubing, although I prefer to use squared tubing such as appears in this figure for the purpose of facilitating welding various of the bracing elements.

In order rigidly to secure the leg 4 within its socket 13 I have employed a number of bolts or rivets 22 which extend through the socket as well as the leg.

At this point it should also be noted that the forward braces 16 diverge from the socket 13 toward the fuselage longérons in order to accommodate rotor starter parts such as the clutch mechanism diagrammatically indicated at 23. Disposition of these parts in this manner provides for extension of the rotor drive shaft, diagrammatically indicated at 24, along the leg 4 upwardly to the rotor axis mechanism. In addition, with this mechanism, the rotor starter shaft and the forward pylon leg 4 may be stream-lined together as a unit, for example, by means of a single stream lined housing or sheath 25. However, various features of a starter mechanism arranged in this manner are not a part of the present invention per se, but are described in the copending application of Joseph S. Pecker, Serial No. 512,383, filed January 30, 1931.

Each one of the rear pylon legs 5, which, as shown, are circular in cross section, is also provided with a socket 26 at its lower end secured thereto as by means of bolts or rivets 27. Here again, bracing elements are employed in order to rigidly secure the sockets 26 and thus obviate flexing or twisting thereof. This bracing means includes forwardly and downwardly extended elements 28 secured to the upper ends of the socket 26 and extended therefrom to the longérons 17, preferably adjacent points of attachments thereto of fuselage cross braces 29. The lower ends of the sockets 26 may be directly secured as by welding to the squared longérons 17.

In addition, the upper ends of the sockets 26 are interbraced as by means of a cross member 30, this cross member being diagonally connected, from its center point, with the longérons 17 by means of braces 31. The frame or truss associated with the sockets 26, therefore, also provides for triangulated interbracing between the fuselage and the pylon legs.

In connection with the disposition of the bracing structures above the fuselage frame, attention is called to the fact that with the various parts disposed in the manner herein illustrated, the fuselage fairing or covering 32 may be arranged to completely cover or enclose all of the various bracing elements and the stress framing is located most advantageously for obtaining good fixation of the lower ends of the pylon legs with the greatest saving in weight and parasite drag. In addition the rear pylon legs 5 may be housed in stream-lined sheaths 33.

In considering various characteristics of the mounting structure of the present invention it might be noted that heretofore pylon legs or posts have been attached or braced to fuselage members substantially at single points at the lower ends of the legs, bracing of the pylon as against excessive weaving being accomplished by diagonal cables, etc., disposed externally of the fuselage fairing. Tests have shown that under various operating conditions, such as application of power through the rotor starter, pylon legs which are secured only at points at their lower ends are flexed longitudinally as well as torsionally as a result of the starter reaction at the top or apex of the pylon. Such flexure, particularly longitudinally of the legs, has been very considerable in various pylons heretofore employed, because the legs or posts were free to bend intermediate their ends and with their ends virtually acting as pivot points.

According to the present invention, flexure or bending of this character is substantially reduced by the use of the leg engaging sockets which, themselves, are rigidly secured to the fuselage as against such bending or twisting. The result, of course, is rigid fixation of a section of each pylon leg, and, as a result of this, simple bending of pylon legs in an arc from their ends as pivot points, is practically eliminated, the absolute fixation of a portion of the leg ends constraining the legs in such manner that stresses must act against the superior resistance of the legs to compound or reflex bending. Indeed, longitudinal flexure of legs secured in this manner, under a given bending moment, is less than half of that found where the pylon legs are secured only or substantially only at their ends. This may be taken advantage of either to reduce the degree of deflection of the legs, or to reduce the size and weight of the legs for an installation of given stresses.

Still further, the extension of the sockets 26 above the fuselage together with the bracing elements therefor which are also disposed above the fuselage, provides for interbracing and strengthening of the pylon legs at upwardly spaced points but yet in such manner that exposed leg interbracing wires or members become unnecessary. The elimination of such exposed bracing elements, of course, reduces head resistance or parasite drag.

I claim:—

1. In a rotative-winged aircraft, an axis structure for the wings, post elements forming a pylon attached to said structure for supporting the same from the craft, and means of fixation to the body of the craft of an extended length of the base ends of the posts, whereby simple flexure of the posts about their base ends as pivots, under stresses imposed on the pylon through said axis structure, is obviated.

2. In a rotative-winged aircraft, an axis structure for the wings, post elements forming a pylon attached to said structure for supporting the same from the craft, means for imparting a driving torque to said wings, and means of fixation to the body of the craft of an extended length of the base ends of the posts, whereby simple flexure of the posts about their base ends as pivots, under stresses imposed on the pylon through said axis structure, and under the influence of said drive, is obviated.

3. In a rotative-winged aircraft, an axis structure for the wings, post elements forming a pylon attached to said structure for supporting the same from the craft, and means of fixation to the body of the craft of an extended length of the base ends of the posts, whereby simple flexure of the posts about their base ends as pivots, under stresses imposed on the pylon through said axis structure, is obviated, together with means housing or stream-lining the last-named means into the body of the craft proper.

4. In a rotative-winged aircraft, an axis structure for the wings, post elements forming a pylon for supporting said structure from the craft, means of fixation of an extended length of the posts on said structure, and means of fixation of an extended length of the posts, at their base ends, on the craft, whereby pivotal action of the posts about their points of attachment, under operating stresses, is substantially obviated.

5. In an aircraft having a fuselage and rotatable sustaining means mounted thereabove, a mounting structure for the sustaining means including a supporting leg member, and a bracing truss or frame inter-connecting the leg member and the fuselage, said frame being disposed at least in large part above the fuselage.

6. In an aircraft having a fuselage and rotatable sustaining means mounted thereabove, a mounting structure for the sustaining means including a supporting leg member, and a bracing truss or frame inter-connecting the leg member and the fuselage, said frame being disposed at least in part above the fuselage, together with fuselage fairing substantially enclosing said frame.

7. In an aircraft having a fuselage with a cockpit therein and rotatable sustaining means mounted thereabove, a mounting structure for the sustaining means including leg members extended upwardly from the fuselage fore and aft of the cockpit, and bracing trusses or frames fore and aft of the cockpit interconnecting leg members and the fuselage, said frames being disposed in large part above the fuselage, together with fuselage fairing having a cockpit opening between the frames and substantially enclosing said frames.

8. In an aircraft having fuselage and rotatable sustaining means mounted thereabove, a mounting structure for the sustaining means including a supporting leg member, and bracing means therefor including a leg engaging device secured to the fuselage and extending thereabove, said device being arranged to brace the leg member as against transverse flexure.

9. In an aircraft having a fuselage and rotatable sustaining means mounted thereabove, a mounting structure for the sustaining means including a supporting leg member, and bracing means therefor including a leg engaging device secured to the fuselage and extended thereabove, said device being arranged to brace the leg member as against transverse and torsional flexure.

10. In an aircraft having a fuselage and rotatable sustaining means mounted thereabove, a mounting structure for the sustaining means including a supporting leg member, and bracing means therefor including a leg engaging device secured to the fuselage and extended thereabove, said device being arranged to brace the leg member as against transverse flexure, and triangulated bracing elements interconnecting said device and the fuselage.

11. In an aircraft having a fuselage and rotatable sustaining means mounted thereabove, a mounting structure for the sustaining means including a supporting leg member, and bracing means therefor including a leg engaging device secured to the fuselage and extended thereabove, said device being telescopically associated with the leg member to provide bracing as against transverse flexure.

12. In an aircraft having a fuselage and rotatable sustaining means mounted thereabove, a mounting structure for the sustaining means including a supporting leg member, and bracing means therefor including a leg engaging device secured to the fuselage, said leg member and said device having at least a pair of angled surfaces adapted to interengage to provide bracing as against torsional flexure.

13. In an aircraft having a fuselage and rotatable sustaining means mounted thereabove, a mounting structure for the sustaining means including a supporting leg member, and bracing means therefor including a leg engaging device secured to the fuselage, said leg member and said device having at least a pair of angled surfaces extended somewhat lengthwise of the leg above the fuselage to provide bracing as against torsional flexure.

14. In an aircraft having a fuselage and rotatable sustaining means mounted thereabove, a mounting structure for the sustaining means including a supporting leg member of angular cross-section, and a strengthening device for the leg of similar angular cross-section engaging the leg.

15. In an aircraft having a fuselage and rotatable sustaining means mounted thereabove, a mounting structure for the sustaining means including a supporting leg member of angular cross-section, and a strengthening device for the leg of similar annular cross-section engaging the leg, said device being extended above the fuselage, together with triangulated bracing elements interconnecting the device and the fuselage.

16. In an aircraft having a fuselage and rotatable sustaining means mounted thereabove, a mounting structure for the sustaining means including a supporting leg member, and a strengthening socket fitting said leg and extended above the fuselage, together with means interbracing said socket and the fuselage.

17. In an aircraft having a fuselage and rotatable sustaining means mounted thereabove, a mounting structure for the sustaining means including a supporting leg member, and a strengthening socket fitting said leg and extended above the fuselage, together with means interbracing said socket and the fuselage, said interbracing means including elements secured to said socket at spaced points.

18. In an aircraft having a fuselage and rotatable sustaining means mounted thereabove, a mounting structure for the sustaining means including a supporting leg member, and a strengthening socket engaging a section of the leg above the fuselage but toward the lower end of the leg, said socket being braced, toward each end thereof, by connection with the fuselage.

19. In a rotative-winged aircraft, an axis structure for the wings, post elements forming a pylon attached to said structure for supporting the same from the craft, and means of fixation to the body of the craft of an extended length of the base ends of the posts, whereby simple flexure of the posts about their base ends as pivots, under stresses imposed on the pylon through said axis structure, is obviated, said means of fixation for the base end of a post comprising a member fixed to the body of the craft in a telescopic relation with the post.

In testimony whereof I have hereunto signed my name.

ROY W. MORSE.